United States Patent
Fontana et al.

(10) Patent No.: US 6,469,125 B1
(45) Date of Patent: Oct. 22, 2002

(54) TALL OIL PITCH-MODIFIED PHENOLIC RESIN AND METHODS RELATED THERETO

(75) Inventors: Thomas A. Fontana, Almere (NL); James C. West, Lawrenceville, NJ (US)

(73) Assignee: Arizona Chemical Company, Jacksonville, FL (US)

( * ) Notice: Subject to any disclaimer, the term of this patent is extended or adjusted under 35 U.S.C. 154(b) by 0 days.

(21) Appl. No.: 09/940,678

(22) Filed: Aug. 27, 2001

(51) Int. Cl.[7] .......................... C08G 8/32; C08G 14/04; C08D 11/06; C08L 61/14
(52) U.S. Cl. ..................... 528/158.5; 523/161; 524/594
(58) Field of Search ................ 528/158.5; 524/594; 523/161

(56) References Cited

U.S. PATENT DOCUMENTS

| | | | |
|---|---|---|---|
| 3,244,580 A | * 4/1966 | Stalego | 524/77 |
| 3,932,686 A | * 1/1976 | Foley et al. | 428/429 |
| 4,022,739 A | 5/1977 | Bove | 524/445 |
| 4,287,104 A | 9/1981 | Dimitri et al. | 524/76 |
| 4,337,193 A | 6/1982 | Szita | 524/14 |
| 4,574,057 A | 3/1986 | Kaza et al. | 106/31.34 |
| 4,629,469 A | 12/1986 | Dilling | 8/557 |
| 5,026,754 A | 6/1991 | Pavlin | 534/272 |
| 5,189,089 A | 2/1993 | Hollis et al. | 524/272 |
| 5,198,024 A | 3/1993 | Tuovinen et al. | 106/31.67 |
| 5,304,225 A | * 4/1994 | Gardziella et al. | 524/841 |
| 5,328,505 A | 7/1994 | Schilling | 106/277 |
| 5,378,272 A | 1/1995 | Romagosa et al. | 106/273.1 |
| 5,432,240 A | 7/1995 | Tsumura et al. | 525/398 |
| 5,484,854 A | 1/1996 | Tsumura et al. | 525/486 |
| 5,521,259 A | 5/1996 | Tsumura et al. | 525/481 |
| 5,635,591 A | 6/1997 | Williams et al. | 530/210 |
| 5,763,565 A | 6/1998 | Williams et al. | 130/210 |
| 5,795,376 A | 8/1998 | Ide | 106/31.73 |
| 5,844,071 A | 12/1998 | Williams et al. | 530/210 |
| 5,886,091 A | 3/1999 | Harris et al. | 524/590 |
| 5,886,128 A | 3/1999 | West et al. | 528/158.5 |
| 5,902,389 A | 5/1999 | Jordan | 106/31.41 |
| 5,942,028 A | 8/1999 | Tomiya et al. | 106/31.78 |
| 5,969,071 A | 10/1999 | Matzinger | 527/602 |
| 5,972,088 A | 10/1999 | Krishnan et al. | 106/31.73 |
| 5,973,062 A | 10/1999 | Harris et al. | 524/590 |
| 6,001,904 A | 12/1999 | Matzinger et al. | 524/31 |
| 6,020,405 A | 2/2000 | Matzinger et al. | 524/31 |

FOREIGN PATENT DOCUMENTS

| CA | 2124488 | 11/1994 |
|---|---|---|
| GB | 1189200 | 4/1970 |

OTHER PUBLICATIONS

Smith, Keith T. "Vinsol Resin and Tall Oil Pitch," in Duane F. Zinkel and James Russell (ed.), *Naval Stores: Production, Chemistry, Utilization*, Pulp Chemicals Association, New York, 1989, Chapter 21, pp. 715–737.

* cited by examiner

*Primary Examiner*—Peter Szekely
(74) *Attorney, Agent, or Firm*—Seed Intellectual Property Law Group PLLC

(57) ABSTRACT

Tall oil pitch may be reacted with a phenol-containing organic compound and formaldehyde or reactive equivalent thereof to prepare a resin. The reactants may further include polyhydric organic compound, $\alpha,\beta$-unsaturated carboxyl compound or ester thereof, and hydroxyl-containing non-phenolic organic compound. The resin may be formulated with a colorant to provide an ink for lithographic, gravure or letterpress printing.

17 Claims, No Drawings

TALL OIL PITCH-MODIFIED PHENOLIC RESIN AND METHODS RELATED THERETO

TECHNICAL FIELD

The present invention relates generally to resins, more specifically to resins prepared from tall oil pitch, phenolic compounds and formaldehyde or reactive equivalent thereof, and to the use of such resins in inks and coatings, particularly inks for lithographic, gravure and letterpress printing.

BACKGROUND OF THE INVENTION

The reaction products of phenolic compounds and formaldehyde or reactive equivalents thereof are very well known. See, e.g., Peter W. Kopf, "Phenolic Resins," *Encyclopedia of Polymer Science and Engineering*, vol. 11, pp. 45–94 John Wiley & Sons, N.Y., 1988. These resins may be used as binders in various inks and coatings, however their use is somewhat limited by their high cost. Less expensive phenolic-type resins are prepared when rosin is included among the reactants that form a phenolic resin. These so-called "rosin-phenolic" resins are very widely used today in lithographic printing processes. See, e.g., Roger E. Burke, "Rosin-based Printing Inks," *Naval Stores*, Chapter 10, Pulp Chemicals Association (1989). However, the increasingly popular use of rosin in other applications, such as tackifiers and other types of resins for various printing and coating processes, has increased competition for an essentially fixed amount of rosin, and increased the incentive to find alternatives to rosin-phenolic resins.

A by-product of the sulfate pulping process is crude tall oil (CTO), and a by-product of CTO fractionation is tall oil pitch. While tall oil pitch has found many commercial applications, there is presently an abundant supply of tall oil pitch that is available at a reasonable price.

Accordingly, there is a need in the art for useful products that can take advantage of the unique composition and reactivity of tall oil pitch. There is also a need in the art for processes that can be used to convert/incorporate tall oil pitch into useful products. There is a further need in the art for viable alternatives to phenolic and rosin-phenolic ink resins. The present invention addresses these long-standing needs, and provides other related advantages, as discussed below.

SUMMARY OF THE INVENTION

Tall oil pitch may be reacted with a phenol-containing organic compound and formaldehyde or reactive equivalent thereof to prepare a resin. The reactants may further include polyhydric organic compound, α,β-unsaturated carboxyl compound or ester, and hydroxyl-containing non-phenolic organic compound. The resin may be formulated with a colorant to provide an ink for lithographic, gravure or letterpress printing.

Thus, in one aspect, the present invention provides a resin composition prepared from reactants comprising tall oil pitch, phenol-containing organic compound, and formaldehyde or reactive equivalent thereof. The phenol-containing organic compound may be selected from phenol and derivatives of phenol wherein 1–3 aromatic phenol hydrogens are replaced with an equal number of substituents independently selected from hydroxyl, $C_1$–$C_{12}$ alkyl, $C_1$–$C_{12}$ alkyl substituted with 1 or 2 groups selected from hydroxyl and phenyl, phenyl, and phenyl substituted with 1 or 2 groups selected from hydroxyl and $C_1$–$C_{12}$ alkyl. For instance, the phenol-containing organic compound may be a para-$C_1$–$C_{12}$ alkylphenol. The formaldehyde or reactive equivalent thereof may be formalin or paraformaldehyde. In one aspect, the reactants include at least 55 wt % pitch, or 55–65 wt % pitch, based on the total weight of the reactants, and the equivalent ratio of hydroxyl from phenol-containing organic compound to aldehyde from formaldehyde or reactive equivalent thereof ranges from 1:2 to 1:4. In a preferred aspect, the composition is completely soluble in tetrahydrofuran at 25 wt % solids.

In preparing the composition, the reactants may further include polyhydric non-phenolic organic compound, also known as polyol. The polyol may, in one aspect of the invention, be selected from $C_2$–$C_{36}$ dihydric compounds, $C_3$–$C_{36}$ trihydric compounds, $C_5$–$C_{36}$ tetrahydric compounds, $C_5$–$C_{36}$ pentahydric compounds and $C_6$–$C_{36}$ hexahydric compounds. In another aspect, the polyol is selected from ethylene glycol, propylene glycol, diethylene glycol, triethylene glycol, butanediol, glycerol, trimethylolpropane, triethylolpropane, pentaerythritol, carbohydrate, dimerized trimethylolpropane, dimerized pentaerythritol and mixtures containing any of these listed alcohols. Thus, in one aspect, the reactants include at least 50 wt % tall oil pitch, the equivalent ratio of hydroxyl from phenol-containing organic compound to aldehyde from formaldehyde or reactive equivalent thereof ranges from 1:2 to 1:4, and the equivalent ratio of hydroxyl from phenol-containing organic compound to hydroxyl from polyol ranges from 1:0.1 to 1:1.

In preparing the composition, the reactants may further include rosin and α,β-unsaturated carboxylic compound. Thus, in one aspect, the tall oil pitch contributes about 5–40 wt % of the total weight of the reactants, the phenol-containing organic compound and formaldehyde or reactive equivalent thereof each contributes less than 10 wt % of the total weight of the reactants, polyol contributes less than 15 wt % of the total weight of the reactants, α,β-unsaturated carboxylate compound or ester thereof contributes less than 10 wt % of the total weight of the reactants, and rosin contributes 30–70 wt % of the total weight of the reactants. In a related aspect, the tall oil pitch contributes about 10–25 wt % of the total weight of the reactants, the phenol-containing organic compound and formaldehyde or reactive equivalent thereof each independently contributes about 4–7 wt % of the total weight of the reactants, polyol contributes less than 15 wt % of the total weight of the reactants, α,β-unsaturated carboxylate compound or ester thereof contributes less than 10 wt % of the total weight of the reactants and rosin contributes 30–70 wt % of the total weight of the reactants.

Thus, in one aspect of the invention, the resin composition is prepared from reactants that include tall oil pitch, rosin, phenol-containing organic compound, formaldehyde or reactive equivalent thereof, α,β-unsaturated carboxylic acid or ester thereof, and polyhydric non-phenolic organic compound.

The present invention also provide an ink composition that includes any of the resins described herein, in admixture with a colorant. The ink composition may be formulated for lithographic printing, in essentially the same manner as lithographic inks are currently formulated using rosin-phenolic resins. The ink composition may be formulated for gravure printing.

The present invention also provides methods of printing with these ink compositions.

In another aspect, the present invention provides a process for preparing a tall oil pitch-modified phenolic resin. The process include heating, within a temperature range of 100–300° C., reactants that include distilled tall oil that includes pitch, phenol-containing organic compound, formaldehyde or reactive equivalent thereof, and hydroxyl-containing non-phenolic organic compound.

These and other aspects of this invention will become apparent upon reference to the following detailed description.

DETAILED DESCRIPTION OF THE INVENTION

The present invention provides for the preparation of useful resins from tall oil pitch, phenol-containing organic compound, and formaldehyde or reactive equivalent thereof. In particular, it has been surprisingly found that pitch may be used to replace some or all of the rosin that is traditionally used to prepare rosin-modified phenolic resins, and yet still provide products that are useful binders in lithographic, gravure and letterpress inks.

The resins of the invention are prepared from components (which may also be called reactants or starting materials) that include tall oil pitch, phenol-containing organic compound (which may also be called a phenolic compound), and formaldehyde or its reactive equivalent. In a preferred embodiment, the components further include a polyhydroxyl-containing non-phenolic organic compound (sometimes more simply referred to a polyol). In another preferred embodiment, the components further include an α,β-unsaturated carboxylic acid compound or ester thereof. In another preferred embodiment, the components further include both of a polyol and an α,β-unsaturated carboxylic acid compound or ester thereof. In another preferred embodiment, the components further include each of a polyol, an α,β-unsaturated carboxylic acid compound or ester thereof, and rosin. In another preferred embodiment, the components further include polyol and rosin.

A. Components Used to Prepare Resins of the Invention

Tall oil pitch is a venerable material of commerce, and is accordingly well known in the art. It is described in, e.g., Kirk Othmer Encyclopedia of Chemical Technology, H. Mark, J. McKetter and D. Othmer, Eds., Vol. 19, pp. 614–619 (2$^{nd}$ ed. 1969) and Smith, K. T. "Vinsol Resin and Tall Oil Pitch," *Naval Stores*, Chapter 21, Pulp Chemicals Association (1989). Tall oil pitch was analyzed and thoroughly described in Era et al. *J. Amer. Oil Chem. Soc.,* Vol. 56, pp. 992–994 (1979) and Holmbom et al., *J. Amer. Oil Chem. Soc.,* Vol. 55, pp. 342–344 (1978). It is available from Arizona Chemical Company, Jacksonville, Fla., as well as many other suppliers.

The precise composition of a tall oil pitch will depend, in part, on the process by which is was isolated. See, e.g., U.S. Pat. Nos. 5,164,480; 5,132,399; 4,553,433; 4,524,024; 4,495,095; 4,308,200; 4,238,304; 4,154,725; 4,075,188; and 3,943,117 for various processes that provide tall oil pitch. Typically, tall oil pitch is formed upon fractionation of crude tall oil (CTO), where CTO is a composition that is obtained as a result of practicing the sulfate wood pulping process. Upon heating, CTO yields volatile materials that primarily consist of so-called heads, rosin and fatty acids. The residue from this distillation process is tall oil pitch. Tall oil pitch contains approximately 52% fatty acids and esterified fatty acids, 14% rosin acids and 34% of a material commonly referred to as "unsaps," where these percentages are on a weight basis. Dimerized rosin and dimerized fatty acid are also often found in tall oil pitch.

A phenol-containing organic compound according to the invention has at least one hydroxyl group directly bonded to an aromatic ring. The parent phenolic compound is phenol itself. Other phenolic compounds are derivatives of phenol wherein 1 to 3 of the aromatic hydrogens are replaced with an equal number of substituents independently selected from hydroxyl; $C_1$–$C_{12}$ alkyl; $C_1$–$C_{12}$ alkyl substituted with 1 or 2 groups selected from hydroxyl and phenyl; phenyl; and phenyl substituted with 1 or 2 groups selected from hydroxyl and $C_1$–$C_{12}$ alkyl.

Specific derivatives of phenol include (unless otherwise stated, any two substituents may be in the ortho, meta or para relationship) cresols (including the ortho, meta and para cresols), 1,3,5-xylenols, iso-propylphenol, tert-butylphenol, amylphenol, octylphenol, nonylphenol, diphenylolpropane, phenylphenol, resorcinol, cashew nutshell liquid, bisphenol-A and cumylphenol. Preferred phenolic compounds have a single substituent in the para position (relative to the hydroxyl group), and include p-tert-butylphenol, p-octylphenol and p-nonylphenol.

The resins of the invention are prepared from formaldehyde (chemical formula $CH_2O$) or a reactive equivalent thereof. Since formaldehyde is a gas at room temperature and ambient pressure, it is somewhat difficult to work with in a laboratory or commercial setting. Accordingly, use of a reactive equivalent thereof, such as a formaldehyde-generating compound in either liquid or solid form, is a preferred manner to introduce formaldehyde into a chemical reaction. For example, formaldehyde may be dissolved in water, where it forms "formalin," of chemical formula $HO(CH_2O)_nH$, where n is roughly 2. Formalins having both 36 wt % and 50 wt % formaldehyde activity are commercially available, and may be used in the practice of this invention.

A preferred reactive equivalent of formaldehyde is paraformaldehyde, which is a solid, water-free oligomer or polymer of formaldehyde. Paraformaldehyde has the chemical formula $HO(CH_2O)_nH$ wherein n is on the order of 20 to 100. Paraformaldehyde is commercially available from many sources, including Celanese (Dallas, Tex.). Other, less preferred sources of formaldehyde include trioxane and hexamethylenetetramine. Trioxane and hexamethylenetetramine are less preferred because their use necessitates special equipment and handling conditions in order to release formaldehyde activity from these chemicals.

The polyhydroxyl-containing compound may also be referred to as a polyol. In order to distinguish the polyol from phenolic compounds (which may also contain more than one hydroxyl group), the polyhydroxyl-containing compound is referred to as being "non-phenolic". The polyol is an organic compound having at least two hydroxyl (—OH) groups. The polyol of the invention may be selected from $C_2$–$C_{36}$ dihydric compounds, $C_3$–$C_{36}$ trihydric compounds, $C_5$–$C_{36}$ tetrahydric compounds, $C_5$–$C_{36}$ pentahydric compounds and $C_6$–$C_{36}$ hexahydric compounds. The hydroxyl groups are preferably primary, that is, attached to a carbon bearing two hydrogen atoms, or, less preferably, secondary, that is, attached to a carbon bearing one hydrogen atom. Tertiary hydroxyl groups are less preferred in the practice of this invention because they are typically unstable to the high temperature conditions required for the reaction which forms a resin of the present invention.

Some examples of $C_2$–$C_{36}$ dihydric compounds include, without limitation, ethylene glycol, propylene glycol, diethylene glycol, triethylene glycol, butanediol, neopentyl glycol, and the like, including dihydric compounds having primary and/or secondary hydroxyl groups. Some nonlimiting examples of $C_3$–$C_{36}$ trihydric compounds include glycerol, trimethylolpropane, triethylolpropane and the like, including primary and/or secondary hydroxyl groups. Pentaerythritol and sugars are essentially the only commercially available, reasonably priced $C_5$–$C_{36}$ tetrahydric compounds, however other tetrahydric compounds could be used in the invention. Dimerized trimethylolpropane and sugars are some of the $C_5$–$C_{36}$ pentahydric compounds that could be used in the invention, while dimerized pentaerythritol (also known as dipentaerythritol) is a preferred example of a $C_6$–$C_{36}$ hexahydric compound.

The α,β-unsaturated carboxyl compound or ester thereof has an olefinic unsaturation adjacent to the carbon atom of a carboxyl group, i.e., has the —C=C—C(=O)—O— arrangement of carbon and oxygen atoms. The α,β-unsaturated carboxyl compound is reactive with rosin and tall oil pitch, to form an adduct therebetween. When the α,β-unsaturated carboxyl compound is maleic anhydride, the adduct is known as maleated rosin. When the α,β-unsaturated carboxyl compound is fumaric acid, or an ester of fumaric acid, then the corresponding adduct is known as fumarated rosin. When the α,β-unsaturated carboxyl compound reacts with tall oil pitch, the reaction product is known as maleated pitch (when maleic anhydride is the α,β-unsaturated carboxyl compound) or fumarated pitch (when fumaric acid or an ester thereof is the α,β-unsaturated carboxyl compound). In addition, the α,β-unsaturated carboxylic compound may react with various other components of the resin-forming reaction, e.g., the polyol component.

Suitable α,β-unsaturated carboxylic compounds include maleic anhydride, fumaric acid, mono ($C_1$–$C_{12}$alkyl) ester of fumaric acid, di($C_1$–$C_{12}$alkyl) ester of fumaric acid, acrylic acid, $C_1$–$C_{12}$alkyl ester of acrylic acid, methacrylic acid, $C_1$–$C_{12}$alkyl ester of methacrylic acid, itaconic acid, and $C_1$–$C_{12}$alkyl ester of itaconic acid. Maleic anhydride, fumaric acid and esters of fumaric acid are preferred α,β-unsaturated carboxylic compounds, with maleic anhydride being most preferred.

Rosin is mainly a mixture of $C_{20}$, tricyclic fused-ring, monocarboxylic acids, typified by abietic acid. Individually, these monocarboxylic acids are commonly referred to as resin acids. Rosin can be obtained from many sources, and can have a wide range of purities. For example, wood rosin may be employed in the invention, where wood rosin is obtained from Pinus stumps after harvesting the stumps, chipping the stumps into small chips, extracting the chips with hexane or higher-boiling paraffins, and distilling the hexane or paraffin and fatty acids to yield wood rosin. Gum rosin, which is the name given to rosin that is obtained after scoring a pine tree, collecting the exudate sap, and then distilling away the volatile components and most of the fatty acids, may also be employed in the invention.

Preferably, the rosin is tall oil rosin, which is a byproduct of the Kraft, i.e., sulfate, pulping process for making paper. According to this process, pinewood is digested with alkali and sulfide, producing tall oil soap and crude sulfate turpentine as by-products. Acidification of this soap followed by fractionation of the crude tall oil yields tall oil rosin and fatty acids.

Rosin is typically characterized by its acid number, and rosins having acid numbers ranging from about 160 to about 180 are preferred according to the invention. Preferably, the tall oil rosin has undergone distillation so as to have less than about 5 weight percent tall oil fatty acids. A preferred rosin is available commercially from Arizona Chemical Company, Jacksonville, FL, under the SYLVAROS® trademark.

Prior to preparing a resin of the present invention, the rosin may be subjected to one or more treatments such as crystallization, disproportionation, partial or complete hydrogenation, dimerization, formaldehyde modification, modification with unsaturated mono-acids (or alkyl monoester thereof) or diacids (or mono- or di-alkyl esters thereof) such as acrylic acid, methacrylic acid, itaconic acid, fumaric acid and maleic anhydride and the like, or to some combination of these treatments. Also, after performing any of the above treatments on the rosin, the rosin may be subjected to distillation, to provide a distillative fraction that is suitably employed in the invention. Such treatments can be used, for example, to modify the melt point of the resin of the present invention. Such treatments are known to those skilled in the art, and indeed many rosins having undergone such treatments are commercially available.

In addition to the above-listed components, one or more optional components may be used to prepare resins of the invention. One such optional component is a reaction rate enhancer. Reaction rate enhancers according to the invention, also sometimes called catalysts or accelerators, are well known in the art as useful additives to increase the rate of phenolic resin preparation. Typical reaction rate enhancers are strongly acidic or alkaline compounds. Preferred reaction rate enhancers are the salts of a metal such as sodium, lithium, calcium, magnesium and zinc. The salts may be the acetate, carbonate, bicarbonate, formate, hydroxide, oxalate or oxide of a metal. Magnesium carbonate, magnesium bicarbonate, magnesium acetate, magnesium formate and magnesium oxalate are preferred. Amines, particularly tertiary amines such as triethylamine, are another suitable class of reaction rate enhancers.

B. Preparation of Pitch-Modified Phenolic Resins

In preparing a tall oil pitch-modified phenolic resin according to the invention, both the relative amounts of the various components that will be used to form the resin, as well the process parameters, must be considered. "Process parameters" refers to the order in which the components are combined, the temperatures to which the components and intermediate products are exposed, the duration of reaction time, etc.

Of course, the proportional amounts of the reactants and the precise process conditions will be partially determined by the desired properties for the product resin. When the resin is formed predominately from tall oil pitch, phenol-containing organic compound and formaldehyde or reactive equivalent thereof, the pitch typically contributes at least about 55 wt % of the total weight of the reactants. As the weight percentage of tall oil pitch decreases, and the weight percentages of phenol and formaldehyde make a corresponding increase, there is a greater likelihood that the reaction mixture will turn into an undesirable gel. When no gel is present in the product resin, it is completely soluble in THF at 25% solids. A preferred tall oil pitch-phenol-formaldehyde resin contains 55–65 wt % tall oil pitch.

The amounts of phenol-containing organic compound and formaldehyde or reactive equivalent thereof in a tall oil pitch-phenol-formaldehyde resin is conveniently expressed in terms of the ratio of the equivalents of hydroxyl from the phenolic compound to the equivalents of aldehyde from the formaldehyde compound. In these terms, a ratio of 1:2 to 1:4 is preferred, with a ratio of about 1:3 being more preferred.

A preferred resin of the invention is prepared from reactants consisting essentially of tall oil pitch, phenol-containing organic compound and formaldehyde or reactive equivalent thereof, in addition to minor optional components such as a reaction rate enhancer. However, another preferred resin of the invention is prepared from reactants that additionally include one or more polyhydric non-phenolic organic compounds, also referred to as a polyol.

When polyol is used as a reactant in a resin-forming reaction, the tall oil pitch component typically constitutes at least about 50 wt % of the total weight of the reactants. A preferred reactant mixture contains about 50–65 wt % tall oil pitch. The equivalent ratio of hydroxyl from phenol-containing organic compound to aldehyde from formaldehyde or reactive equivalent thereof ranges from 1:2 to 1:4, with a ratio of about 1:3 being preferred. The equivalent ratio of hydroxyl from phenol-containing organic compound to hydroxyl from polyol typically ranges from 1:0.1 to 1:1, and is preferably about 1:0.3 to 1:0.7.

A preferred resin of the invention is prepared from reactants consisting essentially of tall oil pitch, phenol-containing organic compound, formaldehyde or reactive equivalent thereof and polyol, in addition to minor components such as a reaction rate enhancer. However, another preferred resin of the invention is prepared from reactants that additionally include rosin and one or more $\alpha,\beta$-unsaturated carboxylic compounds or esters thereof.

For a typical resin intended for use in lithographic inks, tall oil pitch contributes less than about 40 wt % of the total weight of the reactants used to form the resin. Preferably, pitch contributes 10–25 wt %, and more preferably contributes 18–21 wt % of the total weight of the reactive components used to form the resin. The rosin is present in an amount of 30–70 wt %, preferably in an amount of 55–65 wt %. Thus, the tall oil pitch and the rosin together preferably constitute the majority of the weight of the reactants used to form a rosin/pitch phenolic resin of the invention.

The phenol and formaldehyde each contribute up to about 20 wt % of the reactants used to form a rosin/pitch phenolic resin of the invention. The equivalent ratio of hydroxyl from phenol-containing organic compound to aldehyde from formaldehyde or reactive equivalent thereof typically ranges from 1:2 to 1:4, with a ratio of about 1:3 being preferred. When the phenolic compound is bisphenol A and the formaldehyde source is paraformaldehyde, then the phenolic component preferably constitutes about 4–7 wt % of the total weight of the reactants, and the formaldehyde component preferably constitutes about 5–9 wt % of the reactants.

In preparing a tall oil pitch/rosin-phenolic resin, the polyol content of the reactants is about 4–12 wt %, preferably about 6–10 wt %, when the polyol is mono-pentaerythritol. For polyols other than pentaerythritol, an equal equivalent amount, based on hydroxyl groups, of the polyol may be employed. When the $\alpha,\beta$-unsaturated carboxylate compound or ester thereof is maleic anhydride, this component is present within the reactant composition in an amount between 0.1–10 wt %, and preferably is present at an amount of 0.5–6 wt %. When the $\alpha,\beta$-unsaturated carboxylate compound or ester thereof is other than maleic anhydride, an equal equivalent amount, based on the carbonyl groups, of the $\alpha,\beta$-unsaturated carboxylate compound or ester thereof may be employed.

The reaction rate enhancer contributes a minor portion of the total weight of the components used to prepare a resin of the invention. The reaction rate enhancer preferably constitutes less than 3 weight percent, more preferably less than 2 weight percent, and still more preferably less than about 1 weight percent of the total weight of the components used to form a resin of the invention. While greater amounts of reaction rate enhancer might be employed, little or no increase in reaction rate is observed, the cost of the formulation may increase, and residual reaction rate enhancer can be detrimental to the appearance and/or performance properties of the resin. However, at least about 0.01 weight percent, preferably at least about 0.3 weight percent, and more preferably at least about 0.4 weight percent of reaction rate enhancer is present in order to provide significant amounts of rate enhancement.

The resins of the invention may be prepared by reacting together components comprising tall oil pitch, phenol-containing organic compound and formaldehyde, where each of these components has been described above. In addition, optional components may be used to form a resin of the invention, where preferred optional components have also been described above. Essentially any reaction conditions recognized in the art for preparing rosin-modified phenolic resin (including derivatives thereof) may be employed to prepare a resin of the present invention, where the present invention provides that tall oil pitch is used in lieu of some or all of the rosin which is employed in the prior art processes.

Some of the prior art processes for preparing rosin-modified phenolic resins are described in the following U.S. Patents (which are hereby incorporated herein, in their entirety, for all purposes): U.S. Pat. Nos. 5,405,932; 5,198,024; 4,398,016; and 4,391,640.

As used above, the term "reacting together" means that each of the listed components is added to a reaction vessel under reaction conditions such that each component reacts with either a) another component, or b) a reaction product formed from two or more other reaction components. In order for the components to undergo a resin-forming reaction, combinations of the components must be exposed to an elevated temperature in the range of 100–300° C. At these elevated temperatures, the components undergo covalent bond-forming reactions with other components, so that a high molecular weight product is formed.

For example, each of the components may be combined in a single reaction vessel, and the combination taken to elevated temperature so that the components react with one another to form a resin of the invention. This approach may be termed a "one-pot" reaction process. This is the preferred approach for preparing a resin from tall oil pitch, phenolic compound and formaldehyde or equivalent, when rosin is not present among the reactants.

Alternatively, two or more (but less than all) components may be combined in a single reaction vessel, and this combination taken to elevated temperature so that the components react with one another to form an intermediate reaction product. Then other components are reacted with the intermediate reaction product. For example, the phenolic compound and the formaldehyde or equivalent may be reacted together to form a phenolic resin in accordance with known methods. Typical reaction conditions to form a phenolic resin are to combine the phenolic compound and formaldehyde or equivalent in the presence of a catalyst, preferably a basic catalyst such as sodium hydroxide. The combination is then taken to elevated temperature, typically between 50° C. and 160° C., preferably 60° C. to 100° C., under normal pressure or elevated pressure in an autoclave. The resulting phenolic resin can then be added combined with pitch and/or rosin, as well as the other reactants. However, it is preferred that the phenolic compound and formaldehyde or equivalent be reacted together in the presence tall oil pitch and, if present, rosin.

Thus, the invention provides that the components may be reacted with one another in any order, at temperatures within the range of 100–300° C., to obtain a resin of the invention. It should be recognized however that the same components (in terms of quantity and identity) may form resins with different properties, depending on the precise manner in which the components are reacted together.

According to a preferred procedure for preparing a tall oil pitch/rosin-phenolic resin, the rosin and tall oil pitch are charged to a reaction flask, and the mixture heated to achieve a homogeneous, fluid mass. A temperature of about 170° C. is typically sufficient. Then, α,β-unsaturated carboxylic compound or ester thereof may be added, and this mixture maintained at about 170–200° C. for an hour or so while the α,β-unsaturated carboxylic compound or ester thereof reacts with the pitch and/or rosin. The reaction mixture may then be taken to a temperature of about 170–180° C. and the polyol and phenol-containing organic compound are added. The reaction temperature is then further decreased to about 120–130° C., at which point the formaldehyde or reactive equivalent thereof and the reaction rate enhancer are added. At this point, a substantial amount of water vapor may be evolved, and this water is preferably removed from the reaction flask with, e.g., a Dean-Stark trap. After about 2 hours, the majority of the water has been removed from the reaction flask, and then flask contents are taken to about 200° C. for about 10–14 hours. Then the reaction temperature is taken to about 270° C. to ensure complete reaction of the reactants. A slight vacuum may be applied at this point to help drive the reaction to completion. After 2–3 hours, the reaction has typically gone to completion, and the product is discharged from the reactor.

Alternative reactant charging procedures and temperature profiles may be employed to prepare a resin of the invention. It is typically necessary however for the reacting components to be held for some time within the temperature range of about 230° C. to about 280° C., in order for the bulk of the hydroxyl and carboxyl groups to react with one another (esterification), and the acid number to reach a desirably low number. Some mechanism to remove the water formed by the reaction is also typically necessary, where a nitrogen purge through the reacting mixture, and/or adding an organic solvent to the mixture to provide for azeotropic distillation of a water-containing mixture, and/or reduced pressure may be employed for this purpose.

The reaction temperature(s) is selected with the following points in mind. The reaction temperature must be high enough that the contents of the reaction vessel are sufficiently fluid to allow those contents to be stirred. Higher temperatures are generally preferred for reasons of economy, in order to provide a faster rate of reaction. However, the reaction temperature should not be so great that the reaction components boil out of the reaction vessel. Nor should the temperature be so great that decomposition of the reaction components or reaction products should occur.

At some stages of the reaction, the reaction may be conducted under super-atmospheric pressure. The utilization of high pressure tends to mitigate the evaporation of volatile components from the reaction mixture. Increased pressure may be achieved by pumping an atmosphere of gas into the reaction vessel, e.g., air, or an inert gas such as nitrogen. In order to facilitate the use of high pressures, in a preferred embodiment the reaction is conducted in a vessel that can withstand the application of high pressure without rupture. Typically, 1.1–10.0 atmospheres is sufficiently high pressure to maintain volatile components within the vessel, however, the amount of pressure will depend on the temperature of the reaction mixture and the volatility of the relevant chemicals.

The resin forming reaction is preferably conducted in the absence of organic solvent. Under solventless reaction conditions, the reaction temperature must be above the melting point of the reaction components and/or reaction product. This factor sets a lower practical reaction temperature of at least about 100° C. The reaction between phenolic compound and formaldehyde or equivalent occurs at about 50–100° C., and thus a temperature of about 100–130° C. is a good initial temperature for the resin-forming reaction.

The resin forming reaction generates water as a byproduct of the covalent bonds that are formed between members of the reaction components. In order to drive the reaction toward completion, this water should be removed. In the absence of vacuum or azeotrope formation, a reaction temperatures of at least 100° C. is needed in order to distill water away from the reacting components. Thus, at least during the initial stage(s) of resin formation, the reaction temperature is desirably set to about 100–125° C. While a higher initial reaction temperature may be used, the consequence may be water generation at a rate which is much greater than water removal may be conveniently accomplished.

As the resin-forming reaction proceeds, a high molecular weight product forms. In a preferred embodiment of the invention, this reaction product may have a melting point of about 100–1 40° C. Thus, in order to maintain the contents of the reaction vessel in a fluid state, it is necessary to have the reaction temperature above the melting point of the product resin. Therefore, the reaction temperature is preferably gradually raised as the reaction between the components proceeds.

In order to drive the reaction to completion, removal of water may be enhanced through addition of an organic solvent that forms a low-boiling azeotrope with water, and/or the addition of a light vacuum on the reaction vessel. To provide a low-boiling azeotrope, an organic solvent which forms an azeotrope with water, e.g., toluene or xylene, can be added to the reaction vessel, and then removed by distillation, initially under normal pressure, and at the end under vacuum at pressures of between 1000 and 0.1 mbar, preferably 200 to 50 mbar, and temperatures of up to 300° C., preferably of up to 280° C.

The reaction components are maintained at about 250–300° C. until the reaction is considered finished. Reaction progress is conveniently monitored by periodically taking samples of the reaction mixture and measuring the acid number of each sample. Initially, the acid number of the reaction mixture may be as high as about 300. The acid number will gradually fall as the resin-forming reaction proceeds. Melting point (softening point), melt viscosity, and/or solution viscosity measurements may also be made to monitor reaction progress.

C. Properties Used to Characterize Resins of the Invention

The present invention provides for so-called tall oil pitch-modified phenolic resins. These resins may be characterized by their properties, which include acid number, melting point, molecular weight distribution and solubility. In addition, a varnish prepared by combining the tall oil pitch-modified phenolic resin with an organic liquid may be characterized by its properties, including clarity, concentration of resin, rheology and ink oil tolerance (dilutability). For convenience, one of ordinary skill in the art often refers to the varnish properties as being properties of the resin itself, e.g., the "dilutability of the resin is X". This convention may be adopted herein, also for convenience. In any event, these properties are routinely measured for rosin-modified phenolic resins, and thus one of ordinary skill in the art is very familiar with techniques to measure these properties. Nevertheless, a brief description of techniques to measure certain of these properties is provided here.

Acid number is measured by dissolving a known weight of resin into an organic solvent (toluene is a typical solvent), and then titrating a measured amount of methanolic potassium hydroxide (KOH) solution into the resin solution. The titration is complete when a pH of about 7 is attained. The acid number of the resin is equal to the amount of KOH, in mg, which was used in the titration, divided by the weight of resin, in grams, in the sample which was titrated. In other words, acid number is equal to the mg of KOH needed to neutralize 1 gram of sample. The acid numbers described and reported herein were obtained by titration.

Melting point, which may also be referred to as "softening point," may be measured by the so-called "ring and ball" method, which is the subject of ASTM E28. Alternatively, a softening point value may be obtained using a Mettler FP80 Central Processor and a Mettler FP83 HT Dropping Point Cell employing a softening point ring. This apparatus is available from Mettler Laboratories (Hightstown, N.J.). The melting point values described and reported herein were obtained using either a Mettler FP83HT apparatus or a ring-and ball apparatus.

Information about a resin's ink oil tolerance is obtained from dilutability testing. According to this test, a 45 weight percent solution of resin is prepared with M47:TXIB mixed solvent (1:1 weight ratio; M47 is MAGIESOL™ M-47 solvent, a so-called "technical white oil," from Magie Brothers, Franklin Park, Ill., presently a division of Pennzoil Products Company; TXIB™ plasticizer is an ester of the chemical name 2,2,4-trimethyl-1,3-pentanediol diisobutyrate sold by Eastman Chemical, Kingsport, Tenn). Typically, 10 grams of resin solution equilibrated to room temperature is placed in a clean 100 mL glass beaker and a piece of black-on-white printed paper (print font size about 10–12) is placed under the beaker. Then aliquots of M47 are added dropwise and the solution stirred until the solution becomes cloudy to the point where the print under the beaker may no longer be read. The total solution weight (after being titrated to cloudiness by M47) is multiplied by 100 and divided by the original ten gram weight to provide a dilutability result in terms of "percent dilutability".

ARLO solubility is essentially determined in the same manner as described above for determining a resin's ink oil tolerance, with the difference that Alkali Refined Lindseed Oil (ARLO) is used in place of M47:TXIB. The resin is dissolved in ARLO at 33% solids with heating up to 232° C., and then the solution is cooled to room temperature before performing the test. The "ARLO/M47 dilution" or solubility is then measured in the same way as noted above, i.e., 10 grams of 33% solids ARLO/resin solution (equilibrated to room temperature) is placed in a clean 100 mL glass beaker and a piece of black-on-white printed paper (print font size about 10–12) is placed under the beaker. Then aliquots of M47 are added dropwise and the solution stirred until the solution becomes cloudy to the point where the print under the beaker may no longer be read. The total solution weight (after being titrated to cloudiness by M47) is multiplied by 100 and divided by the original ten gram weight to provide a dilutability result in terms of "percent dilutability". This is also referred to as ARLO/M47 solubility.

Viscosity is measured on resin solutions using Gardner viscosity tubes compared to reference standards. In this test a resin solution is poured into a tube of standard (10.65 mm) internal diameter leaving a standard volume of air at the top of the tube. The tube is corked and placed in a water bath at 25° C. Tubes filled with silicone oil based standard of known viscosity are placed in a rack next to the tube with the resin solution of unknown viscosity. The tubes are inverted and the viscosity is determined relative to standard by comparing the rate of rise of the bubbles created by the air space at top of the tubes. This so-called "bubble rise time" viscosity is reported by comparison to standards. The standards range from low viscosity to high viscosity as follows: A3, A2, A1, A through Z, Z1 through Z10. If the bubble of the unknown is between two of the reference standards it is reported as such. For example if the bubble of the unknown sample rises at a rate between the Z and Z1 tube, the viscosity is reported as Z–Z1.

D. Ink Composition Tall Oil Pitch Modified Phenolic Resin

The present invention provides an ink, suitable for lithographic (also called offset), gravure or letterpress printing. A lithographic ink contains a tall oil pitch modified phenolic resin as disclosed herein, in addition to a solvent, a colorant and additives. The inventive resin can be used alone or with conventional co-resins. Suitable co-resins include, without limitation, rosin modified maleic and phenolic esters, hydrocarbon resins and alkyds. Suitable solvents include, without limitation, mineral oils, aromatic and ester solvents. Suitable colorants include both flushed color and dry pigments. Additives can include, without limitation, gelling agents, slip additives, waxes and antioxidants. In addition to the materials noted above, the ink additionally may contain any number of optional components, where the optional components provide for improvements in the performance of the ink. Ink performance properties include color strength, gloss, scuff resistance, block resistance, misting, open time on press and many other properties.

In order to optimize the transfer property of the ink from the printing plate to the substrate, it is necessary for the ink to have good flow characteristics under shear conditions while exhibiting an appropriate low tack value. Ink with a gel-like character under low shear conditions is particularly preferred in lithographic printing because it has good transfer properties and demonstrates low tack under high shear press conditions. In the absence of shear the transfer is completed, fixing the ink to the substrate. For example, upon printing an ink having a gel structure, the raster points are advantageously sharply printed and, when the hydrocarbon solvent is absorbed into the substrate, there is little or no bleeding of the ink and thus no blurring of the printed image. These performance properties are particularly important during high-speed printing.

To obtain gel-like character, gel-forming agents may be added to a varnish intended for lithographic inks. Aluminum compounds, such as aluminum alkoxides are commonly used gel-forming agents, and may be present in the ink according to the present invention. A varnish having gel-like character may be prepared by dissolving the binder resin in a hydrocarbon solvent at elevated temperature, typically at about 160° to 180° C., then adding the gel-forming agent, adjusting tack and viscosity and allowing the solution to cool to room temperature. The gelled varnish is also commonly referred to as a letdown varnish. One of ordinary skill in the art is familiar with preparing gel-like lithographic varnishes using gel-forming agents, and may adopt other procedures for preparing such a gel varnish.

Lithographic ink may be prepared by adding colorant (flush color or dry pigment), additives and additional solvent to the letdown varnish prepared according the present invention. Flush color is a form of pigment where the solvent used during the pigment manufacturing process (water) has been replaced by a hydrocarbon or oil based varnish. Such a varnish can contain the inventive or conventional resins or a combination of both. Finished ink may be prepared by adding the flush color and the letdown varnish while mixing at low shear. The mixture can be passed one or more times over a three roll mill to further reduce pigment particle size and improve final ink properties. Additional varnish or solvent can be added to adjust tack, flow and viscosity to reach target specifications and then additives are blended in. One of ordinary skill in the art is familiar with preparing lithographic inks using either flush color and dry pigment and may adopt other procedures for preparing such a lithographic ink.

The invention is illustrated in more detail by the following examples. In the examples, "rosin" refers to UNITOL® HYR rosin as obtained from Union Camp Corporation, Wayne, N.J. (now part of Arizona Chemical Company, Jacksonville, Fla.), while "T-1 pitch" refers to the residue from the fractional distillation of crude tall oil after the removal of the lower boiling rosins and fatty acids, where a commercial examples is UNI-TOL® DPX. Paraformaldehyde was obtained from Celanese, Dallas Tex. Maleic anhydride was obtained from Monsanto, St. Louis, Missouri. Monopentaerythritol was obtained from Hercules Incorporated, Wilmington, Del.

EXAMPLES

Example 1

A glass reaction flask was charged with 1,716.5 grams of rosin and 572.2 grams of T-1 pitch. This mixture was heated to 173° C., at which point 25.0 grams of maleic anhydride were added. Heating was continued to 200° C. and the reaction mixture held at 200° C. for about 30 minutes. The reaction mixture was cooled to 172° C. and 215.0 grams of mono-pentaerythritol followed by 173.2 grams bisphenol A were added. The reaction mixture was continually stirred as it cooled to 129° C. over about 30 minutes. At this point, 211.8 grams of paraformaldehyde and 2.7 grams of magnesium oxide were added. The mixture was maintained at 124–129° C. for about 3 hours. It was heated to 200° C. and held at this temperature for 15 hours.

The temperature was increased to 270° C. with vacuum being applied after a couple of hours. A vacuum of between about 18 and 26 inches of mercury was maintained for about 3 hours during which time the acid number was reduced to approximately 28. At this point the temperature was reduced to about 250° C. and 10 grams of maleic anhydride were added. After about 30 minutes, an additional 15 grams of maleic anhydride were added. After an additional 30 minutes, 9 grams of glycerin were added. After another hour, the resin was discharged and characterized to have a softening point of 139.1° C., an acid number of 31.1, an ARLO/M47 dilution of 110%, a 1:2 ARLO of Z6− and a Gardner color of 15−. The resin appeared bright and clear.

Example 2

The procedure of Example 1 was essentially repeated with the following changes. Twenty grams of maleic anhydride were used rather than 25 grams. 128.7 grams of bisphenol A were used rather than 173.2 grams. The procedure was otherwise essentially exactly the same as in Example 1. The final resin had a softening point of 145.8° C., an acid number of 22.6, an ARLO/M47 dilution of 107%, and a visc 1:2 ARLO of Z6−. In preparing the resin of Example 2, no maleic anhydride or glycerin were added after vacuum was initiated.

Example 3

The procedure of Example 2 was essentially repeated with the following reactants. 1,716.5 grams (59.3 wt %), rosin, 572.2 grams (19.8 wt %) T-1 pitch, 40.0 grams (1.4 wt %) maleic anhydride, 230.0 grams (7.94 wt %) mono-pentaerythritol, 150.6 grams (5.2 wt %) bisphenol A, 184.2 grams (6.4 wt %) paraform, and 2.7 grams (0.1 wt % magnesium oxide). The resultant resin had a softening point of 133.4° C., an acid number of 23.5, an ARLO/M47 dilution of 162%, an 1:2 ARLO viscosity of Z1+ and a Gardner color of 15+.

Example 4

The procedure of Example 2 was essentially followed with the following reactants. 1,716.5 grams (60.0 wt %) rosin, 572.2 grams (20.0 wt %) T-1 pitch, 20.0 grams (0.7 wt %) maleic anhydride, 215.0 grams (7.5 wt %) mono-pentaerythritol, 150.6 grams (5.3 wt %) bisphenol A, 184.2 grams (6.4 wt %) paraformaldehyde, and 2.7 grams (0.1 wt %) magnesium oxide. The resultant resin had a softening point of 130.3° C., an acid number of 20.2, an ARLO/M47 dilution of 225%, an 1:2 ARLO viscosity of Z+ and a Gardner color of 16−.

Example 5

The procedure of Example 2 was essentially repeated with the following reactants. 1,716.5 grams (59.3 wt %) rosin, 572.2 grams (19.8 wt %) T-1 pitch, 20.0 grams (0.6 wt %) maleic anhydride, 215.0 grams (7.4 wt %) mono-pentaerythritol, 165.7 grams (5.7 wt %) bisphenol A, 202.6 grams (7.60 wt %) paraformaldehyde, 202.6 grams (7.0 wt %) paraformaldehyde, and 2.7 grams (0.1 wt %) magnesium oxide. The resulting resin had a softening point of 132.8° C., an acid number of 20.4, an ARLO/M47 dilution of 193%, and a 1:2 ARLO visc of Z1–Z2.

Example 6

A resin kettle was charged with 1,620 grams (59.0 wt %) rosin and 180.0 grams (6.6 wt %) T-1 pitch. This mixture was heated to 174° C. and 166.1 grams (6.0 wt %) maleic anhydride was added. The temperature was increased to 200° C. over approximately 1 hour, and 240.0 grams (8.7 wt %) mono-pentaerythritol was added. The temperature was further reduced to 170° C., at which point 199.3 grams (7.3 wt %) p-tert-butylphenol and 3.3 grams (0.1 wt %) bisphenol A were added. The temperature was further reduced to 130° C. over approximately 30 minutes, at which point 117.1 grams (4.3 wt %) paraformaldehyde and 3.3 grams (0.1 wt %) magnesium oxide were added. The reaction mixture was held at 120° C. for about 4 hours during which there was a reflux observed. After this 4 hour hold period, the reaction temperature was increased to 190° C. and maintained at that temperature for 12 hours. A mixture of 70.6 grams (2.6 wt %) zinc oxide and 3.3 grams (0.1 wt %) calcium hydroxide in 145.3 grams (5.3 wt %) ISOPAR E™ solvent (Exxon Corporation, Irving Tex.) were added. The reaction mixture was heated to about 260° C., and maintained at that temperature for about 3 hours and poured from the flask. The thus obtained resin had an acid number of 60, a 1:2 ARLO visc of Z5+ and a Gardner color of 15+.

Example 7

The procedure of Example 6 was essentially repeated with the following reactants. 1,530 grams (5.5 wt %) rosin, 270 grams (9.97 wt %) T-1 pitch, 174.4 grams (6.3 wt %) maleic anhydride, 240.0 grams (8.7 wt %) mono-pentaeythritol, 199.3 grams (7.2 wt %) p-tert-butylphenol, 3.3 grams (0.1 wt %) bisphenol A, 117.1 grams (4.3 wt %) paraformaldehyde, 3.3 grams (0.12 wt %) magnesium oxide, 70.6 grams (2.6 wt %) zinc oxide, 3.3 grams (0.1 wt %)

calcium hydroxide, and 145.3 grams (5.3 wt %) ISOPAR E™ solvent. The final product had a viscosity at 55% weight solids in toluene of Z4–Z5, a Gardner color of 16.

Example 8

A 5 liter flask was charged with 1,797.6 grams (60.6 wt %) rosin and 449.4 grams (15.1 wt %) T-1 pitch. The flask contents were stirred and heated under a nitrogen atmosphere until a temperature of 164° C. was obtained. With the nitrogen atmosphere turned off, 208.0 grams (7.0 wt %) maleic anhydride was added. The reaction temperature was increased to 200° C. over about 30 minutes and held at 200° C. for an additional 30 minutes. The reaction contents were cooled to 164° C. over about 2 hours and 20 minutes, at which point, 120.0 grams (4.0 wt %) nonylphenol was added, followed by 345.0 grams (11.6 wt %) mono-pentaerythritol. The temperature was reduced to 130° C. over about 15 minutes, and then to the flask was added 43.1 grams (1.5 wt %) paraformaldehyde followed by 4.5 grams (0.2 wt %) magnesium oxide. The reaction contents were held at 125–130° C. for about 2 hours and then the reaction was heated to 195° C. The reactants were held at this temperature for about 14 hours, after which the temperature was raised to 270° C. After about one hour, vacuum was applied to 26 inches of mercury. After a couple more hours, the reaction flask contents were discharged. The final product had a softening point of 161.6° C., a viscosity in toluene at 55% solids of Z5$^-$, a Gardner color of 17+ as measured as a 55 wt % toluene solution, a toluene/M47 dilution of 135%, an ARLO viscosity of Z6+, a color of 16+, and an ARLO/M47 dilution of 140%.

Example 9

The procedure of Example 8 was followed with the following reactants. 1,797.6 grams (59.7 wt %) rosin, 449.4 grams (14.9 wt %) T-1 pitch, 137.3 grams (4.6 wt %) maleic anhydride, 240.0 grams (8.0 wt %) nonylphenol, 295.0 grams (9.8 wt %) mono-pentaerythritol, 86.2 grams (2.9 wt %) paraformaldehyde and 4.5 grams (0.2 wt %) magnesium oxide. The final product had a softening point of 133.8° C.

Example 10

The procedure of Example 8 was followed with the following reactants. 2,022.3 grams (65.4 wt %) rosin, 224.7 grams (7.3 wt %) T-1 pitch, 172.7 grams (5.6 wt %) maleic anhydride, 240.0 grams (7.8 wt %) nonylphenol, 340.0 grams (11.0 wt %) mono-pentaerythritol, 86.2 grams (2.8 wt %) paraformaldehyde, and 4.5 grams (0.15 wt %) magnesium oxide. The final resin had a softening point of 161.5° C. and an acid number of 23.4.

Example 11

The procedure of Example 8 was followed with the following reactants. 2,022.3 grams (68.2 wt %) rosin, 224.7 grams (7.6 wt %) T-1 pitch, 208.0 grams (7.0 wt %) maleic anhydride, 120.0 grams (4.0 wt %) nonylphenol, 345.0 grams (11.6 wt %) mono-pentaerythritol, 43.1 grams (1.5 wt %) paraformaldehyde, and 4.5 grams (0.2 wt %) magnesium oxide. The final product had a softening point of 155.5° C., and an acid number of 28.1.

Example 12

A 5 liter reaction flask was charged with 1,716.5 grams (58.1 wt %) rosin and 572.2 grams (19.4 wt %) T-1 pitch. The contents were heated to 175° C., at which point 72.4 grams (2.5 wt %) maleic anhydride was added. The reaction mixture was heated to 200° C., held at this temperature for 30 minutes, and cooled to 165° C., at which point 255.0 grams (8.6 wt %) mono-pentaerythritol and 150.6 grams (5.1 wt %) bisphenol A were added. The temperature in the reaction flask was lowered to 130° C., at which point 184.2 grams (6.2 wt %) paraformaldehyde and 2.7 grams (0.1 wt %) magnesium oxide were added. The flask contents were maintained for 2 hours at between 122 and 125° C., at which point the temperature was raised to 195° C. After about 12 hours at 195° C. the contents were taken to 280° C. and placed under a vacuum of about 22 inches of mercury. After about 3 hours the contents were discharged from the reactor. The final resin had a viscosity in toluene as measured at 43% solids of Z3+, a dilution of 165 mLs per 14.8 seconds, heptane tolerance of 9.9 grams to cloud point, a Gardner color of 15, an acid number of 33.5, and a softening point of 142.5° C.

Example 13

The procedure of Example 12 was essentially followed with the exception that the rosin was not added to the flask until after the T-1 pitch had reached a temperature of 175° C. In this example, the following reactants were used: 1,144.3 grams (39 wt %) unitol hyr rosin, 1,144.3 grams (39.0 wt %) T-1 pitch, 144.0 grams (4.9 wt %) mono-pentaerythritol, 225.9 grams (7.7 wt %) bisphenol A, 276.3 grams (9.4 wt %) paraformaldehyde, and 2.7 grams (0.1 wt %) magnesium oxide. The final reaction contained some gelled material and was not fully characterized.

Example 14

The procedure of Example 12 was essentially followed with the following reactants. 1,716.5 grams (58.3 wt %) rosin, 572.2 grams (19.4 wt %) T-1 pitch, 66.9 grams (2.3 wt %) maleic anhydride, 250.9 grams (8.5 wt %) mono-pentaerythritol, 150.6 grams (5.1 wt %) bisphenol A, 184.2 grams (6.3 wt %) paraformaldehyde, and 2.7 grams (0.1 wt %) magnesium oxide. The final product had a softening point of 146.9° C., an acid number of 30.7, a viscosity, 1:2 ARLO seconds of 181.4, and an ARLO/M47 dilution of 96.1%.

Example 15

The procedure of Example 14 was essentially repeated, however the maleic anhydride charge was reduced by 10%. Thus, 60.2 grams of maleic anhydride were used in Example 15 rather than the 66.9 grams which were used in Example 14. The product resin had a softening point of 138.5° C., an acid number of 27.7, a 1:2 ARLO viscosity (letter) Z7$^-$, a 1:2 ARLO viscosity (seconds) of 307.6, ARLO/M47 dilution of 88%, and a 1:2 ARLO color of 15.

Example 16

The procedure of Example 14 was essentially repeated, however, in this instance the maleic anhydride charge was reduced by 20%. Thus, 53.5 grams (1.8 wt %) of maleic anhydride was used rather than 66.9 grams (2.3 wt %) as was used in Example 14. The final resin had a softening point of 147.6° C., an acid number of 25.4, a 1:2 ARLO viscosity of Z6+, a 1:2 ARLO viscosity of 221.4 seconds, an ARLO/M47 dilution of 104.1% and a 1:2 ARLO Gardner color of 15.

Example 17

A reaction kettle was charged with 215.8 g (43.2 wt %) rosin and 91.1 g (18.2 wt %) pitch, and these ingredients were heated to 128° C. under a nitrogen blanket with stirring, to produce a homogeneous solution. Then 91.1 g (18.2 wt %) para-tert-butylphenol was added with stirring. The reaction temperature was reduced to 108° C., and then 25 g of xylene was added, followed immediately by 59.0 g paraformaldehyde (11.2 wt %) and 0.56 g (0.11 wt %) magnesium oxide. The temperature was maintained at about 110° C. for four hours, then increased to 135° C. while a Barret trap was installed. The temperature was further increased to 200° C. over three hours. After being held at 200° C. for one hour, 35.3 g (7.1 wt %) pentaerythritol was added to the reaction mixture. The temperature was then increased to about 270° C. and the nitrogen blanket changed to a nitrogen sweep. After about one hour, the flask contents were placed under vacuum at 270° C. for about 5.5 hours to remove any residual volatile material. The product resin was then discharged from the flask.

Examples 18–24

The reactants and amounts shown in Table 1 below were used to form resins according to the following procedure:

Pitch was charged to a reaction kettle and then heated under a nitrogen blanket to about 140° C. The para-tert-butylphenol was added to the pitch with stirring, and then the temperature reduced to about 100° C. At this point, the paraformaldehyde and magnesium oxide were added, and the reaction mixture was maintained at about 105–110° C. for about four hours, with visible refluxing. A Barret trap was placed on the top of the reaction kettle, and the temperature within the kettle was increased to 175° C. over a 45 minute period. By the time the reaction temperature reached 175° C., about 140 mL of water and other volatile material were collected in the Barret trap. The reaction temperature was then gradually increased to about 260° C. over a three hour period, and maintained at this temperature for about six hours, at which point the reaction product was discharged from the kettle.

TABLE 1

| Component | Ex. 18 | Ex. 19 | Ex. 20 | Ex. 21 | Ex. 22 | Ex. 23 | Ex. 24 |
| --- | --- | --- | --- | --- | --- | --- | --- |
| Pitch | 47.24 | 53.72 | 57.12 | 59.03 | 59.03 | 61.00 | 63.10 |
| MgO | 0.10 | 0.11 | 0.12 | 0.12 | 0.12 | 0.12 | 0.13 |
| PTBP | 32.61 | 28.60 | 26.49 | 25.29 | 25.29 | 24.08 | 22.76 |
| Paraform | 20.05 | 17.57 | 16.28 | 15.55 | 15.55 | 14.80 | 14.01 |
| Softening Point (° C.) | gel | Gel | Gel | gel | 130 | 135 | 120 |

Examples 25–29

Examples 25–29 were run as follows, using the reactants and amounts set forth in Table 2 below. Pitch was charged to a reaction kettle and then heated to about 140° C. under a nitrogen blanket. The phenolic compound (either para-tert-butylphenol (PTBP) or bisphenol A (BPA) was added to the hot stirring pitch. The temperature was reduced to about 110° C., and xylene (about 25 mL per 430 g pitch+phenol) was added followed immediately by addition of paraformaldehyde and magnesium oxide. The reaction mixture was maintained at about 105–110° C. for about two hours, then a Barret trap was installed. The temperature was gradually raised to 200° C. over about two hours, and maintained at that temperature for about 2.5 hours. The pentaerythritol (PE) was then added with stirring, and the temperature raised to 260–270° C. After about 4.5 hours within this temperature range, the product resin was discharged from the reaction kettle.

TABLE 2

| Component | Ex. 25 | Ex. 26 | Ex. 27 | Ex. 28 | Ex. 29 |
| --- | --- | --- | --- | --- | --- |
| Pitch | 58.2 | 62.3 | 62.3 | 66.3 | 73.1 |
| PTBP | 25.0 | 22.5 | 22.5 | 20.0 | none |
| BPA | none | none | none | none | 11.7 |
| Paraform | 15.3 | 13.8 | 13.8 | 12.3 | 13.5 |
| MgO | 0.12 | 0.11 | 0.11 | 0.12 | 0.13 |
| PE | 1.36 | 1.36 | 1.36 | 1.36 | 1.60 |

Example 30

The procedure of Examples 25–29 was followed, using nonylphenol is place of the para-tert-butylphenol or bisphenol A. The reactant amounts were 320.7 g (64.1 wt %) pitch, 126.3 g (25.3 wt %) nonylphenol, 52.3 g (10.5 wt %) paraformaldehyde, 0.65 g (0.13 wt %) magnesium oxide and about 25 g of xylene.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A resin composition prepared from reactants comprising tall oil pitch, phenol-containing organic compound, and formaldehyde or reactive equivalent thereof, wherein the phenol-containing organic compound is para-C1–C12 alkylphenol.

2. The composition of claim 1 wherein the formaldehyde or reactive equivalent thereof is selected from the group consisting of formalin and paraformaldehyde.

3. A resin composition prepared from reactants comprising tall oil pitch, phenol-containing organic compound, and formaldehyde or reactive equivalent thereof wherein the reactants comprise at least 55 wt % pitch, and the equivalent ratio of hydroxyl from phenol-containing organic compound to aldehyde from formaldehyde or reactive equivalent thereof ranges from 1:2 to 1:4.

4. The composition of claim 3 wherein the reactants comprise 55–65 wt % pitch.

5. The composition of claim 1 which is completely soluble in tetrahydrofuran at 25 wt % solids.

6. A resin composition prepared from reactants comprising tall oil pitch, phenol-containing organic compound, and formaldehyde or reactive equivalent thereof;

wherein the reactants further comprise polyhydric non-phenolic organic compound or polyol; and wherein the reactants comprise at least 50 wt % tall oil pitch, the equivalent ratio of hydroxyl from phenol-containing organic compound to aldehyde from formaldehyde or reactive equivalent thereof ranges from 1:2 to 1:4, and the equivalent ratio of hydroxyl from phenol-containing organic compound to hydroxyl from polyol ranges from 1:0.1 to 1:1.

7. The composition of claim 6 wherein the polyol is selected from the group consisting of $C_2$–$C_{36}$ dihydric compounds, $C_3$–$C_{36}$ trihydric compounds, $C_5$–$C_{36}$ tetrahydric compounds, $C_5$–$C_{36}$ pentahydric compounds and $C_6$–$C_{36}$ hexahydric compounds.

8. The composition of claim 6 wherein the polyol is selected from the group consisting of ethylene glycol, propylene glycol, diethylene glycol, triethylene glycol, butanediol, glycerol, trimethylolpropane, triethylolpropane, pentaerythritol, carbohydrate, dimerized trimethylolpropane, dimerized pentaerythritol and mixtures containing any of these listed alcohols.

9. A resin composition prepared from reactants comprising tall oil pitch, phenol-containing organic compound, and formaldehyde or reactive equivalent thereof; wherein the reactants further comprise rosin and α,β-unsaturated carboxylic acid compound or ester thereof, wherein said rosin is selected from the group consisting of wood rosin, gum rosin and tall oil rosin.

10. The composition of claim 9 wherein the tall oil pitch contributes about 5–40 wt % of the total weight of the reactants, the phenol-containing organic compound and formaldehyde or reactive equivalent thereof each contributes less than 10 wt % of the total weight of the reactants, α,β-unsaturated carboxylic acid compound or ester thereof contributes less than 10 wt % of the total weight of the reactants and rosin contributes 30–70 wt % of the total weight of the reactants.

11. The composition of claim 9 wherein the tall oil pitch contributes about 10–25 wt % of the total weight of the reactants, the phenol-containing organic compound and formaldehyde or reactive equivalent thereof each independently contributes about 4–7 wt % of the total weight of the reactants, α,β-unsaturated carboxylic acid compound or ester thereof contributes less than 10 wt % of the total weight of the reactants and rosin contributes 30–70 wt % of the total weight of the reactants.

12. A resin composition prepared from reactants comprising tall oil pitch, rosin, phenol-containing organic compound, formaldehyde or reactive equivalent thereof, α,β-unsaturated carboxylic acid or ester thereof, and polyhydric non-phenolic organic compound, wherein said rosin is selected from the group consisting of wood rosin, gum rosin and tall oil rosin.

13. An ink composition comprising a colorant and a resin composition prepared from reactants comprising tall oil pitch, phenol-containing organic compound, and formaldehyde or reactive equivalent thereof.

14. A process for preparing a tall oil pitch-modified phenolic resin comprising heating, within a temperature range of 100–300° C., reactants comprising tall oil pitch, phenol-containing organic compound, formaldehyde or reactive equivalent thereof, rosin, and hydroxyl-containing non-phenolic organic compound, wherein said rosin is selected from the group consisting of wood rosin, gum rosin and tall oil rosin.

15. An ink composition comprising a colorant and a resin composition prepared from reactants comprising tall oil pitch, rosin, phenol-containing organic compound, formaldehyde or reactive equivalent thereof, α,β-unsaturated carboxylic acid or ester thereof, and polyhydric non-phenolic organic compound, wherein said rosin is selected from the group consisting of wood rosin, gum rosin and tall oil rosin.

16. A resin composition prepared from reactants comprising tall oil pitch, phenol-containing organic compound, and formaldehyde or reactive equivalent thereof, wherein said phenol-containing organic compound is a derivative of phenol wherein 1–3 aromatic phenol hydrogens are replaced with an equal number of substituents, where said substituents are independently selected from the group consisting of hydroxyl, $C_1$–$C_{12}$ alkyl, $C_1$–$C_{12}$ alkyl substituted with 1 or 2 groups selected from the group consisting of hydroxyl and phenyl, phenyl, and phenyl substituted with 1 or 2 groups selected from the group consisting of hydroxyl and $C_1$–$C_{12}$ alkyl.

17. A resin composition prepared from reactants comprising tall oil pitch, rosin, phenol-containing organic compound, and formaldehyde or reactive equivalent thereof, wherein said rosin is selected from the group consisting of wood rosin, gum rosin and tall oil rosin.

* * * * *